United States Patent Office 2,971,635
Patented Feb. 14, 1961

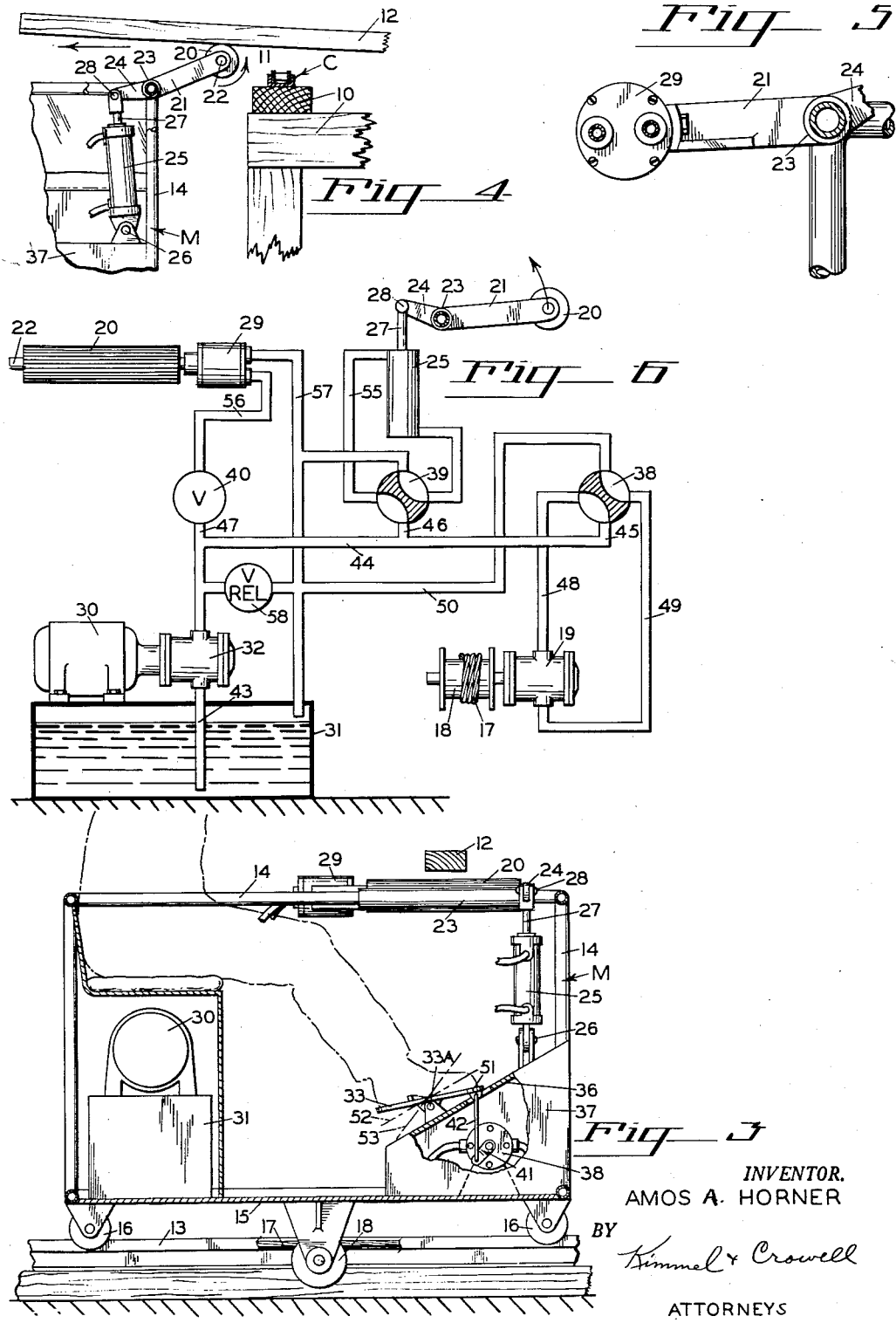

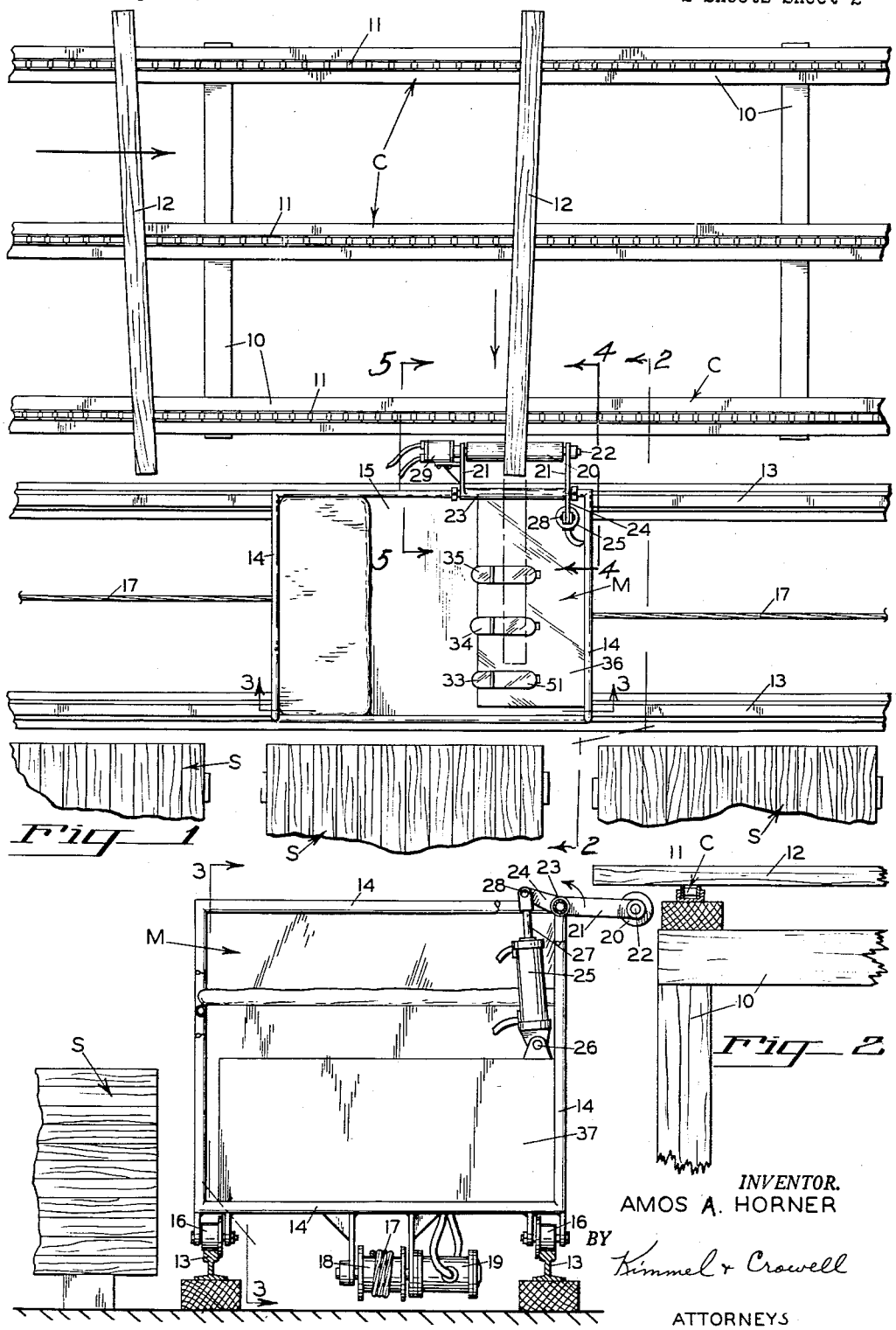

2,971,635
LUMBER SORTING MACHINE
Amos A. Horner, Star Rte. 2, Cascadia, Oreg.
Filed Sept. 4, 1956, Ser. No. 607,897
2 Claims. (Cl. 198—185)

The present invention relates to a lumber sorting machine, which is particularly adapted for sorting lumber or plywood in sawmill or plywood plants. The machine is adapted for moving the lumber or plywood from conveyors or green chains and delivering the same on to stock piles adjacent the conveyor chains.

The primary object of this invention is to provide a carriage adapted to move parallel with the lumber conveyor chains of the lumber mill or plywood plant, carrying an operator who selects various pieces of lumber from the conveyor and transfers the same on this device to receiving stock piles of various grades of lumber. The device is operated along a track by power means controlled by the operator, and means is provided within the device for removing boards or plywood from the conveying chain, transferring the same to receiving piles adjacent the chains. The machine is designed to carry an operator and a movable power driven feed roller that is adapted to engage the lumber carried by the conveyor chains, conveying the same transversely of the machine of the device on to stock piles. This action may be operated by the foot of the operator. The device is adapted to be moved along the conveyor chains by power means controlled by the feet of the operator giving the operator full use of his hands for handling the selected lumber to be transferred from the conveyor chains on to the stock piles.

Other objects and advantages will become apparent in the following specification when considered in the light of the attached drawings, in which:

Figure 1 is a fragmentary plan view of the invention.

Figure 2 is a fragmentary sectional view of the conveyor chains, showing an end view of the lumber sorting machine, taken on line 2—2 of Figure 1, looking in the direction indicated.

Figure 3 is a longitudinal sectional view, taken on line 3—3 of Figure 2, looking in the direction indicated with parts broken away for convenience of illustration.

Figure 4 is a fragmentary sectional view, taken on line 4—4 of Figure 1, looking in the direction indicated.

Figure 5 is a fragmentary end sectional view, taken on line 5—5 of Figure 1, looking in the direction indicated.

Figure 6 is a diagrammatical layout of the hydraulic operating mechanism for moving the carriage along the track adjacent the conveyor chain and for operating the transfer roller.

Referring now to the drawings in detail wherein like reference characters indicate like parts throughout the several figures, the reference character C indicates generally a conventional lumber conveyor including the usual supporting framework 10, having conveyor chains 11 running throughout the length of the conveyor C. Lumber to be stacked is indicated at 12 and may be either boards of lumber, as indicated, or plywood.

This invention consists in providing a carriage or mule M, operating on the tracks 13. The tracks 13 running parallel to the conveyor chains 11. The carriage M consists of a framework or cage 14 forming a part of the platform 15. Trunnion wheels 16 are mounted to the underside of the platform 15 and travel on the rails 13. A cable 17 is fixedly anchored at both of its ends to the framework of the mill (not shown) and is adapted to be wrapped about the cable drum 18, referring to Figures 2 and 3 particularly.

When the drum 18 is revolved by the hydraulic motor 19 the carriage M is moved along the track 13 in either direction, depending upon the wishes of the operator. A feed roller 20 is journalled to the arms 21 by its shaft 22. The arms 21 are pivotally mounted to the framework 14 at 23. A lever 24, forming part of the arms 21, extends beyond the point 23 and is adapted to be rotated about the center 23 by the hydraulic cylinder 25.

The cylinder 25 is fixedly and pivotally mounted to the carriage M at 26 and has its piston 27 pivotally connected to the arm 24 at 28. The feed roller 20 normally rests in the position shown in Figures 2, 5 and 6, but is raised to the position shown in Figure 4 when removing the lumber 12 from the conveyor C. The feed roller 20 is rotated by a hydraulic motor 29 which is keyed to the shaft 22.

An electric motor 30 is mounted upon the oil reservoir 31, referring to Figures 3 and 6 and is adapted to drive the hydraulic pump 32 for supplying hydraulic fluid under pressure to the hydraulic cylinder 25 and to the hydraulic motors 19 and 29. The flow of the hydraulic fluid is controlled by foot pedals 33, referring to Figures 1 and 3.

The pedals 33 are pivotally mounted to the floor board 36 by the pivot mountings 33A, which forms part of the housing 37 for housing the hydraulic control valves 38, 39 and 40 and are connected to the operating arms 41 of the control valves 38 and 39 by the links 42.

Referring particularly to Figure 6, the hydraulic pump 32 receives hydraulic fluid from the tank 31 through the suction pipe 43, forcing the same into the manifold 44 which delivers the fluid under pressure to the valves 38, 39 and 40 through the pipes 45, 46 and 47. The valve 38 delivers fluid to the motor 19 through piping 48 and back to the supply tank 31 through pipe 49 through the valve 38, pipe 50 into the tank 31. The valve 38 is shown in the drawings in position for driving the motor 19 in one direction.

The foot of the operator is shown forcing the toe 51 of the pedal 33 down, pushing the valve 38 to the position shown in the diagram, presumably causing the carriage M to move forward. When the pedal 33 is brought to the broken line position 52, the valve 38 will be closed, and the carriage M standing still, but when the pedal 33 is brought to the broken line position 53, the valve 38 will be moved to reverse position, reversing the flow of fluid through the hydraulic valve 38 and hydraulic motor 19.

The valve 39 is shown in position for raising the feed roller 20 towards the position shown in Figure 4 for moving the lumber 12 off the conveyor chains 11 and on to one of the stock piles S. This valve 39 is controlled by the pedal 34 which will move the valve 39 to either one position or the other, similar to that of the pedal 33 having just been described.

When the valve 39 is in the position shown, fluid will flow from the manifold 44 through the valve 39 through pipe 46, through the pipe 55 into the top of the cylinder 25, which will raise the feed roller 20. Fluid will be exhausted from the bottom of the cylinder 25 through the valve 39, into the return line 57 to the tank 31.

The motor 29 for driving the feed roller 20 receives its fluid through the valve 40, which is foot operated and causes the same to travel in one direction only, receiving fluid from the manifold 44 through pipe 47 through the pipe 56 through the motor 29 and back to the tank through pipe 57. The usual relief valve 58 is provided for by-passing the fluid developed over a predetermined pressure from the pump 32, back to the tank 31.

The mode of operation of this lumber sorting machine will now be described. The operator, shown by broken lines in Figure 3, may be either seated or standing within the carriage M. By operating the pedal 33, as above described, he can move the carriage M forward or backward along the conveyor C. The cable drum 18 is rotated by the hydraulic motor 19, the cable drum 18 being caused to move along the cable 17.

By pressing down on the pedal 35 he can start the feed roller 20 into rotation in the direction of the arrow, then by pressing forwardly and downwardly on the pedal 34 he can raise the feed roller 20 up under the lumber 12, as best illustrated in Figures 1 and 4. This will move the lumber 12, as indicated by broken lines, across and over the carriage M and on to the selected stock pile S, the operator having full use of his hands in the directing of the movement of lumber 12.

The operator can stop the movement of the board 12 at any moment by pressing rearwardly on the pedal 35 and closing the valve 40, stopping the motor 29. He can move the carriage M either forward or backward instantly by the operation of the pedal 33 controlling the valve 38 as above described.

The electric motor 30 receives its electrical supply or energy from a travelling electric conductor, not here shown, and I do not wish to be limited to using hydraulic power, as any form of power may be used, as for instance electric motors could be used entirely.

Having thus described the preferred embodiment of the invention, it should be understood that numerous structural modifications and adaptations may be resorted to without departing from the scope of the appended claims.

What is claimed is:

1. A lumber sorting machine for selectively removing lumber from a lumber conveyor comprising a trackway positioned adjacent and parallel to said conveyor, a vehicle movably mounted on said trackway, power means on said vehicle for moving said vehicle on said trackway, a pair of arms arranged on said vehicle in spaced parallel transversely extending relation, a longitudinally extending horizontal shaft pivotally mounting said arms to said vehicle, a rotatable conveyor roller journalled between said arms spaced from and parallel to said shaft, power means on said vehicle for pivoting said arms about said shaft raising said conveyor roller with relation to said vehicle to contact and slightly raise lumber arranged in overlying relation thereto on said lumber conveyor, and power means connected to said conveyor roller for rotating said roller on its axis to move lumber resting thereon transversely of said vehicle off of said lumber conveyor.

2. A device as claimed in claim 1 wherein the power means on said vehicle for pivoting said arms about said shaft includes a hydraulic ram on said vehicle and means connecting said ram to said arms to pivot said arms upon actuation of said ram.

References Cited in the file of this patent

UNITED STATES PATENTS

| | | |
|---|---|---|
| 1,272,655 | Gawlet | July 16, 1918 |
| 2,147,522 | Byington | Feb. 14, 1939 |
| 2,494,103 | Penberthy | Jan. 10, 1950 |
| 2,599,052 | Forman | June 3, 1952 |
| 2,743,826 | Aschenwald | May 1, 1956 |
| 2,744,644 | Hackney | May 8, 1956 |
| 2,760,654 | Goebel et al. | Aug. 28, 1956 |